United States Patent
Ni et al.

(10) Patent No.: US 9,680,702 B1
(45) Date of Patent: Jun. 13, 2017

(54) NETWORK OF NETWORKS DIFFUSION CONTROL

(71) Applicant: HRL Laboratories, LLC, Malibu, CA (US)

(72) Inventors: Kang-Yu Ni, Calabasas, CA (US); Matthew S. Keegan, Marina del Rey, CA (US)

(73) Assignee: HRL Laboratories, LLC, Malibu, CA (US)

( * ) Notice: Subject to any disclaimer, the term of this patent is extended or adjusted under 35 U.S.C. 154(b) by 171 days.

(21) Appl. No.: 14/294,037

(22) Filed: Jun. 2, 2014

(51) Int. Cl.
H04L 12/24 (2006.01)

(52) U.S. Cl.
CPC ...... H04L 41/0813 (2013.01); H04L 41/0893 (2013.01)

(58) Field of Classification Search
CPC . H04L 12/1863; H04L 12/4076; H04L 12/46; H04L 12/4633; H04L 12/4641; H04L 12/66; H04L 41/0654; H04L 45/02; H04L 69/00; H04L 41/08; H04L 41/0813; H04L 41/0816; H04L 41/0893; H04L 41/0896; H04L 41/14; H04L 41/145; H04L 43/08; H04W 28/0284; H04W 28/08; H04W 36/14; H04W 48/14; H04W 48/17; H04W 48/18; H04W 64/00; H04W 76/021; H04W 76/022; H04W 84/12; H04W 92/02
See application file for complete search history.

(56) References Cited

U.S. PATENT DOCUMENTS

| 6,879,593 B1 * | 4/2005 | Kunze | H04L 29/06 370/401 |
| 7,860,105 B2 * | 12/2010 | Kunze | H04L 29/06 370/395.31 |
| 8,040,896 B2 * | 10/2011 | Nguyen | H04L 12/2856 370/235 |

(Continued)

FOREIGN PATENT DOCUMENTS

IL    WO 2011141911 A1 * 11/2011 ......... H04L 12/6418

OTHER PUBLICATIONS

Li et al., Cascading Failures in Interdependent Lattice Networks: The Critical Role of the Length of Dependency Links, May 31, 2012, Physical Review Letters, 108, 228702.*

(Continued)

*Primary Examiner* — Michael Thier
*Assistant Examiner* — Eric Nowlin
(74) *Attorney, Agent, or Firm* — North Shore Associates (57) ABSTRACT

Diffusion control in a network of networks (NoN) uses a connection degree of node pairs to control diffusion within the NoN. A method of increasing diffusion includes selecting an unconnected node pair having a lowest connection degree and connected nodes of the selected unconnected node pair. A method of decreasing diffusion includes selecting a connected node pair having a highest connection degree and disconnecting nodes of the selected connected node pair. A network diffusion control system includes the NoN and a diffusion controller to one or both of increase a diffusion rate and decrease the diffusion rate within the NoN. A non-transitory computer readable medium includes instructions that implement the diffusion control within the NoN.

20 Claims, 6 Drawing Sheets

(56) References Cited

U.S. PATENT DOCUMENTS

| | | | | |
|---|---|---|---|---|
| 8,117,657 B1* | 2/2012 | Elrod | H04L 63/0236 | 713/151 |
| 8,199,646 B1* | 6/2012 | Cain | H04L 45/02 | 370/231 |
| 8,346,919 B1* | 1/2013 | Eiriksson | H04L 69/22 | 709/203 |
| 8,886,821 B1* | 11/2014 | Eiriksson | H04L 69/22 | 709/224 |
| 9,357,003 B1* | 5/2016 | Eiriksson | H04L 69/22 | |
| 2004/0179531 A1* | 9/2004 | Bi | H04L 12/5601 | 370/395.2 |
| 2005/0030959 A1* | 2/2005 | Kunze | H04L 29/06 | 370/401 |
| 2006/0165226 A1* | 7/2006 | Ernst | H04L 29/12103 | 379/114.01 |
| 2007/0291679 A1* | 12/2007 | Kawakami | H04L 45/48 | 370/328 |
| 2008/0025209 A1* | 1/2008 | Banner | H04L 45/00 | 370/228 |
| 2008/0026724 A1* | 1/2008 | Zhang | H04L 63/08 | 455/411 |
| 2008/0075025 A1* | 3/2008 | Hall | H04L 12/5601 | 370/310.1 |
| 2008/0095153 A1* | 4/2008 | Fukunaga | H04L 43/028 | 370/389 |
| 2008/0225716 A1* | 9/2008 | Lange | H04L 12/5695 | 370/232 |
| 2009/0016304 A1* | 1/2009 | Aust | H04L 69/32 | 370/332 |
| 2009/0016331 A1* | 1/2009 | Shah | H04L 45/128 | 370/356 |
| 2010/0005320 A1* | 1/2010 | Squillante | H04L 12/10 | 713/300 |
| 2010/0302939 A1* | 12/2010 | Denis | H04L 12/5695 | 370/230 |
| 2010/0332642 A1* | 12/2010 | Krishnaswamy | H04L 41/14 | 709/224 |
| 2012/0216259 A1* | 8/2012 | Okamoto | H04L 12/4641 | 726/4 |
| 2013/0016605 A1* | 1/2013 | Chen | H04L 45/02 | 370/221 |
| 2013/0021918 A1* | 1/2013 | Fiorone | H04L 43/0817 | 370/242 |
| 2014/0032659 A1* | 1/2014 | Marini | H04L 51/32 | 709/204 |
| 2015/0050925 A1* | 2/2015 | Tapia | H04W 24/04 | 455/418 |
| 2016/0278006 A1* | 9/2016 | Lee | H04W 12/00 | |
| 2017/0006451 A1* | 1/2017 | Mandanapu | H04L 43/028 | |

OTHER PUBLICATIONS

Parshani et al., Interdependent Networks: Reducing the Coupling Strength Leads to a Change from a First to Second Order Percolation Transition, Jul. 21, 2010, Physical Review Letters, 105, 048701 (2010).*

Ash et al., Optimizing Complex Networks for Resilence Against Cascading Failure, Physica A: Statistical Mechanics and its Applications, Jul. 2007, vol. 380, pp. 673-683.*

Wang, et al., Robustness of Internet under targeted attack: A cascading failure perspective, Sep. 17, 2013, Journal of Network and Computer Applications 40 (2014): 97-104.*

Gao et al., From a single network to a network of networks, Jul. 16, 2014, National Science Review, vol. 1, Issue 3.*

Crucitti et al., Model for Cascading Failures in Complex Networks, Physical Review E 69, Apr. 29, 2004, 045104(R).*

Erdos, P. et al., "On the evolution of random graphs," Publications of the Mathematical Institute of the Hungarian Academy of Sciences, vol. 5, 1960, pp. 17-61.

Erdos, P. et al., "On the evolution of random graphs," Bull. Inst. Internat. Statist., vol. 38, No. 4, 1961, pp. 343-347.

Spielman, D. A. et al., "A Local Clustering Algorithm for Massive Graphs and Its Application to Nearly Linear Time Graph Partitioning," SIAM J. Comput., vol. 42, No. 1, 2013, pp. 1-26.

Pastor-Satorras, R. et al., "Epidemic dynamics in finite size scale-free networks," Phys. Rev. E, vol. 65, No. 3, 2002, 035108, pp. 1-4.

Pastor-Satorras, R. et al., "Epidemic Spreading in Scale-Free Networks," Phys. Rev. Lett, vol. 86, No. 14, 2001, pp. 3200-3203.

Page, L. et al., "The PageRank Citation Ranking: Bringing Order to the Web," Tech. Report, Stanford InfoLab, No. 1999-66, 1999, pp. 1-17.

Kasprzyk, R. et al., "Diffusion in Networks," J. Telecomm. And Informat. Tech., vol. 2, 2012, pp. 99-106.

Gomez, S. et al., "Diffusion dynamics on multiplex networks," Phys. Rev. Lett., vol. 110, No. 2, 2013, pp. 1-5.

* cited by examiner

NETWORK OF NETWORKS DIFFUSION CONTROL

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to networks and networking. In particular, the invention relates to information diffusion within networks having a plurality of nodes.

2. Description of Related Art

Broadly defined, a network is an interconnected group or system of entities. In particular, the entities of the group or system are interconnected to share or distribute data or more generally information among the entities that are members of the network. Networks are found in a wide variety of fields, disciplines and situations including, but not limited to, biology (e.g., neural networks, social networks, business networks, etc.), electrical systems (e.g., power distribution grids), electronic systems (e.g., circuit boards, integrated circuits, radio and television networks, etc.) and computer systems (e.g., local area networks, computer-based social networks, the Internet, etc.).

Information or data distribution in these and other networks often may be modeled by diffusion or, more precisely, as a diffusion process. That is, information or data often moves through a network in a manner that resembles diffusion. It can be important to control the distribution of data or information or equivalently to control 'diffusion' within a network. For example, it may be useful to increase diffusion of information in a network that may have suffered a disruption of connectivity. In another example, it may be important to limit the spread of information (i.e., to decrease diffusion) in a network, for example, where that information may be disruptive or even harmful to member entities of the network.

BRIEF SUMMARY

In some embodiments, a method of increasing diffusion within a network of networks (NoN) is provided. The method of increasing diffusion comprises selecting an unconnected node pair of the NoN having a lowest connection degree relative to other unconnected node pairs of the NoN. The unconnected node pairs of the NoN have a first node in a first network of the NoN and a second node in a second network of the NoN. The method of increasing diffusion further comprises connecting the first node of the selected unconnected node pair to the second node of the selected unconnected node pair using a connecting element of the NoN.

In some embodiments, a method of decreasing diffusion within a network of networks (NoN) is provided. The method of decreasing diffusion comprises selecting a connected node pair of the NoN having a highest connection degree relative to other connected node pairs of the NoN. The connected node pairs have a first node in a first network of the NoN and a second node in a second network of the NoN. The method of decreasing diffusion further comprises disconnecting the first node of the selected connected node pair from the second node of the selected connected node pair using a connecting element of the NoN.

In some embodiments, a network diffusion control system is provided. The network diffusion control system comprises a network of networks (NoN) that comprises a first network and a second network. The network diffusion control system further comprises a diffusion controller to one or both increase a diffusion rate within the NoN by connecting an unconnected node pair of the NoN having a lowest connection degree relative to other unconnected node pairs of the NoN and decrease the diffusion rate within the NoN by disconnecting a connected node pair of the NoN having a highest connection degree relative to other connected node pairs of the NoN. The unconnected node pairs and the connected node pairs have a first node of the node pair in the first network and a second node of the node pair in the second network.

In some embodiments, a non-transitory computer readable medium including instructions that, when executed by a processor, implement a diffusion control in a network of networks (NoN) is provided. The implemented diffusion control comprises one or both of selecting an unconnected node pair having a lowest connection degree relative to other unconnected node pairs of the NoN and connecting nodes of the selected unconnected node pair to one another to increase a diffusion rate of the NoN; and selecting a connected node pair having a highest connection degree relative to other connected node pairs of the NoN and disconnecting nodes of the selected connected node pair from one another to decrease the diffusion rate within the NoN.

BRIEF DESCRIPTION OF THE DRAWINGS

Various features of embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Embodiments consistent with the principles of the present invention provide diffusion control within a network of networks. In particular, embodiments of the present invention provide one or both of an increase in diffusion and a decrease in diffusion within the network of networks. According to various embodiments, the diffusion control employs a connection degree associated with node pairs between a first network of the network of networks and a second network of the network of networks. Controlling diffusion may be used to adjust or control a diffusion rate or more generally to impact diffusion dynamics of various diffusion-like processes in the network of networks according to various embodiments.

A 'network' is defined herein as a plurality of nodes interconnected to one another by connections or edges. In general terms, the nodes represent physical elements of the network at which information is one or more of stored, processed, created and utilized. The connections represent information pathways between the nodes, according to various embodiments. For example, the network may be a computer network or a data network in which the nodes are computers, processors or related computing devices. The connections or edges of a computer or data network may be communication channels between the nodes, for example. An example of a computer or data computer network is the Internet or World Wide Web. Individual computers (e.g., application and storage servers, personal computers, printers, etc.) connected to the Internet are the nodes while a communication channel (e.g., Ethernet, WiFi, etc.) acts as the connection between the individual computer and the Internet, for example. Other examples of networks include, but are not limited to, biological and artificial neural networks, social networks (e.g., Facebook®, Twitter®, Instagram®, etc.), business networks, telecommunication networks, television networks, wireless networks, supply chains, and electrical distribution networks (e.g., the electrical power grid or so-called 'smart' grid). Networks may also include mixed or aggregated networks. For example, an example of a network may be the electrical power grid comprising a plurality of networked power stations, substations, etc., along with a network of interconnected computers that control the electrical power grid. The computers may be networked to each other and to the electrical power grid, for example. Facebook® is a registered trademark of Facebook, Inc., Menlo Park, Calif.; Twitter® is a registered trademark of Twitter, Inc., San Francisco, Calif.; and Instagram® is a registered trademark of Instagram, LLC, Menlo Park, Calif.

According to some embodiments, the network may be modeled as a random graph such as, but not limited to, an Erdos-Renyi random graph in which a graph having n nodes (i.e., network nodes) and M edges (i.e., network connections) is either selected at random from a collection of all graphs having n nodes and M edges or the graph is constructed by connecting the n nodes randomly with the M edges. The Erdos-Renyi random graph is described by Erdős, Paul and A. Rényi, "On the evolution of random graphs," *Publications of the Mathematical Institute of the Hungarian Academy of Sciences*, Vol. 5, 1960, pp. 17-61, incorporated by reference herein.

Herein, a 'network of networks' also referred to as a 'multiplexed network' is defined as a plurality of interconnected networks. In particular, a network of networks comprises a first network and a second network along with connections or potential connections between the first and second network. The Internet is often referred to as a network of networks in that the Internet generally comprises a plurality of computer networks interconnected to one another by a communications backbone or grid. Connections between the first network and the second network of the network of networks are referred to as 'node pairs' herein. In particular, by definition herein, a node pair that connects the first network of a network of networks to a second network of the network of networks is a 'connected node pair.' A node pair that has a potential connection between the first and second networks (i.e., a connection that may be provided) is referred to as an 'unconnected node pair,' by definition herein. According to various embodiments, an unconnected node pair may become a connected node pair by connecting nodes of the node pair. Likewise, a connected node pair may become an unconnected node pair by disconnecting the nodes of the node pair, according to various embodiments.

Herein, a 'connection degree' of a node in a network is defined as a number of other nodes in the network that are connected to the node. Equivalently, the 'connection degree' of a node may be defined as a number of connections between the node and other nodes in the network. In a network of networks, the connection degree of a node in a first network of the network of networks does not include a connection between the node and one or more nodes in a second network of the network of networks, by definition herein.

Herein, 'diffusion' is defined with respect to a network as the spread of information or data within the network. In particular, diffusion may be characterized by a rate (i.e., a diffusion rate) with which information flows from node to node and ultimately throughout the various interconnected nodes of the network. By extension, 'diffusion rate' is defined as a rate of information spread through the network. For example, the diffusion rate may be related to a percentage of edge connections across the network or equivalently a percentage of edge connections between networks of a network of networks, since information flows through either the network or network of networks by way of the edge connections, according to various embodiments.

In some examples, network dynamical properties such as diffusion and diffusion rate may be understood or 'captured' by analyzing eigenvalues of a graph Laplacian matrix. In particular, for a one-to-one connected network of networks, a so-called supra-Laplacian matrix L may be given by equation (1) as $$L = \begin{pmatrix} L_1 & 0 \\ 0 & L_2 \end{pmatrix} + c \begin{pmatrix} I & -I \\ -I & I \end{pmatrix} \quad (1)$$

where $L_1$ is a graph Laplacian matrix of a first N-node layer or network (e.g., layer 1) of the network of networks, $L_2$ is a graph Laplacian matrix of a second N-node layer or network (e.g., layer 2), c is a constant edge weight of the edges in the network of networks, and I is an N×N identity matrix. The inverse of the second smallest eigenvalue $\lambda_2$ of the supra-Laplacian matrix L is related to diffusive processes, i.e., diffusion time/rate τ is equal to inverse $\lambda_2$ (τ=1/$\lambda_2$). See, for example, Gomez et al., "Diffusion dynamics on multiplex networks," *Physical Review Letters,* 110, 028701 (2013), pp. 1-5, incorporated herein by reference in its entirety. Further, diffusive processes may model random walks on graphs and describe the effectiveness of a random graph search. In addition, it has been shown that the value of the second smallest eigenvalue $\lambda_2$ is related to the probability that a contagion may spread into or become an epidemic. Pastor-Sattoras et al., "Epidemic dynamics in finite size scale-free networks," *Physical Review E,* 65, 035108(R) (2002), pp. 1-4, incorporated by reference in its entirety. In some examples, the supra-Laplacian matrix L may be generalized to a network of networks having less than one-to-one connectivity by replacing the identity matrix I in equation (1) with a diagonal matrix D having either '1' or '0' along the diagonal corresponding to the connections or potential connections between the networks of the network of networks (i.e., a '1' indicates a connection or potential connection and '0' indicates no connection).

Embodiments consistent with the principles described herein may be implemented using a variety of devices and circuits including, but not limited to, integrated circuits (ICs), very large scale integrated (VLSI) circuits, application specific integrated circuits (ASIC), field programmable gate arrays (FPGAs) and the like, firmware, software, and a combination of two or more of the above. For example, elements or 'blocks' of an apparatus consistent with the principles described herein may all be implemented as circuit elements within an ASIC or a VLSI circuit.

Implementations that employ an ASIC or a VLSI circuit are examples of hardware-based circuit implementation, for example. In another example, the entire apparatus may be implemented as software using a computer programming language (e.g., C/C++) or software-based modeling environment (e.g., Matlab®, MathWorks, Inc., Natick, Mass.). Implementation of the entire apparatus as software is an example of a purely software implementation. In yet another example, some of the blocks may be implemented using actual circuitry (e.g., as an IC or an ASIC) while other blocks may be implemented in software or firmware.

Herein, a 'non-transitory computer readable medium' is defined as substantially any data storage medium that provides non-transitory storage of information that may be read or otherwise utilized by a computer. For example, computer readable memory including, but not limited to, random access memory (RAM), read-only memory (ROM), programmable or erasable ROM and flash memory (e.g., a thumb drive) are all non-transitory computer readable medium, by definition herein. Other examples of non-transitory computer readable medium include, but are not limited to, various types of magnetic disks and disk drives (e.g., a hard disk drive, a floppy disk drive, a floppy diskette, etc.) along with various optical discs and disc drives (e.g., CD, CD-R, CD-RW, DVD, etc.), by definition herein. In addition, network attached storage, so-called 'cloud' storage (e.g., remote data storage accessible via the Internet), and various other types of computer readable medium used by modern computing systems may be non-transitory computer readable medium, by definition herein.

Further, as used herein, the article 'a' is intended to have its ordinary meaning in the patent arts, namely 'one or more'. For example, 'a node' means one or more nodes and as such, 'the node' means 'the node(s)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Moreover, examples and embodiments herein are intended to be illustrative only and are presented for discussion purposes and not by way of limitation.

Figure 1:
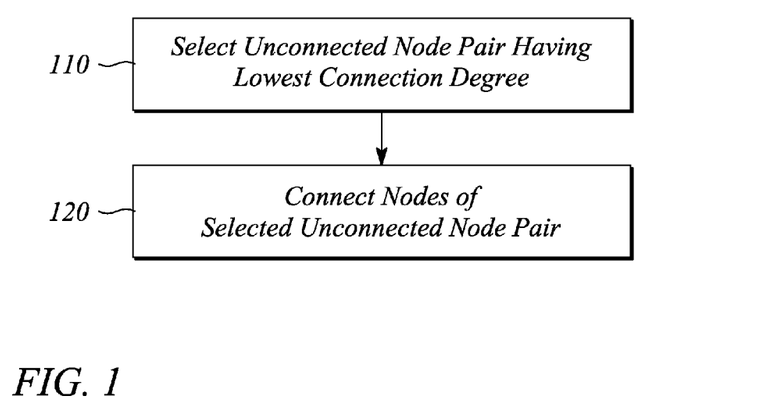
FIG. 1 illustrates flow chart of a method of increasing diffusion within a network of networks (NoN), according to an embodiment consistent with the principles of the present invention.

In some embodiments of the present invention, a method of increasing diffusion is provided. FIG. 1 illustrates flow chart of a method 100 of increasing diffusion within a network of networks (NoN), according to an embodiment consistent with the principles of the present invention. As illustrated, the method 100 of increasing diffusion comprises selecting 110 an unconnected node pair of the NoN having a lowest connection degree relative to other unconnected node pairs of the NoN. The unconnected node pairs of the NoN, whether the selected unconnected node pair or not, each has a first node in the first network of the NoN and a second node in the second network of the NoN, according to various embodiments.

In particular, according to various embodiments, the NoN comprises a first network and a second network. Pairs of nodes or 'node pairs' of the NoN define connections or at least potential connections (e.g., while the node pairs are unconnected) between the nodes in the first network and the nodes in the second network of the NoN. In particular, a 'connected node pair' connects the first and second networks at first and second nodes of the connected node pair, by definition herein. The connection provided by the connected node pair allows information (e.g., data) to flow between the first network and the second network through the connection, according to various embodiments. On the other hand, an 'unconnected node pair' defines a potential connection between the first network and the second network of the NoN. The potential connection of the unconnected node pair does not support the flow of information. In particular, while the nodes of the unconnected node pair remain unconnected, direct information flow between these nodes is substantially blocked, by definition herein. An unconnected node pair may be transformed into a connected node pair and vice versa, according to various embodiments.

As illustrated in FIG. 1, the method 100 of increasing diffusion further comprises connecting 120 nodes of the selected unconnected node pair to one another. In particular, the first node of the selected unconnected node pair is connected 120 to the second node of the selected unconnected node pair, according to various embodiments. Connecting 120 the nodes substantially transforms the selected unconnected node pair into a connected node pair. Connecting 120 the nodes may be accomplished by any of a variety of means depending on an architecture or topology of the NoN (e.g., various structural and data communication characteristics of the NoN). For example, connecting 120 the nodes may employ one or more of a switch, a destination address, and connection of a cable to connect the nodes of the selected unconnected node pair. In particular, connecting 120 employs a connection element, characteristic or structure (e.g., a switch, a cable, a destination address, etc.) of the NoN to connect the nodes, according to various embodiments.

In some embodiments, the unconnected node pairs are predetermined pairs of nodes in the NoN. In particular, the nodes of the unconnected node pair may be identified or defined as a pair of nodes whether or not an actual or physical connection exists between the nodes. For example, the pair of nodes that make up an unconnected node pair may be nodes that are connected by a communication channel that is switched off (e.g., the pair has a 'potential' connection). The nodes of the unconnected node pair may be substantially unconnected by virtue of a switch in an 'OFF' state, for example. In this example, the communication channel predetermines that the pair of nodes is a predetermined node pair. Moreover, the switch that is 'OFF' prevents information flow through the communication channel such that the predetermined node pair is an unconnected node pair, in this example. According to various examples, the communication channel of a NoN may include, but is not limited to, a wire, a cable (e.g., coax cable, twisted pair cable, etc.), an optical link (e.g., an optical fiber), and a wireless link or channel (e.g., a radio frequency (RF) or microwave link).

In other examples, the unconnected node pairs of the NoN may be determined substantially arbitrarily (i.e., not predetermined). In particular, a node in the first network that does not connect to a node in the second network (i.e., an unconnected node in the first network) may be arbitrarily assigned to or paired with a similarly unconnected node in the second network to provide an unconnected node pair. For example, the unconnected node pairs may be arbitrarily defined or designated at a time of selecting 110 the unconnected node pair. Note that, by definition, the nodes of the unconnected node pair are not connected to one another and therefore, do not provide a direct connection between the first and second networks. However, each of the nodes of the unconnected node pair may and generally do connect to other nodes within their respective networks.

According to various embodiments, connecting 120 nodes of selected, arbitrarily designated, unconnected node pairs may be provided by the NoN in a number of ways. For example, a NoN may include a flexible networking structure that facilitates connecting 120 substantially any unconnected node of the first network to substantially any unconnected node of the second network. A non-blocking switch matrix may be employed to provide this sort of flexible networking structure, for example. In another example, the flexible networking structure may comprise a cable that is connected as needed between a node of the first network and a node of a second network. In yet another example, the flexible networking structure may employ a broadcast architecture (e.g., a one-to-many broadcast architecture) with an address overlay (e.g., Ethernet) to establish flexibly defined node pairs.

According to some embodiments, a number of nodes in the first network may be equal to a number of nodes in the second network of the NoN. In other embodiments, the number of nodes in the first network may be greater than the number of nodes in the second network. In yet other embodiments, the number of nodes in the second network may be greater than the number of nodes in the first network.

According to some embodiments, there are more nodes in one or both of the first network and the second network than unconnected node pairs of nodes in the NoN. In particular, one or both of the number of nodes in the first network and the number of nodes in the second network may be greater than a number of the unconnected node pairs in the NoN, according to some embodiments. For example, when the unconnected node pairs are predetermined pairs of nodes in the NoN, there may be fewer predetermined pairs of nodes than there are nodes in one or both of the first network and the second network. In other embodiments, the number of unconnected node pairs may substantially equal the number of nodes in one or both of the first network and the second network of the NoN. For example, in a 'one-to-one' connected NoN, the number of nodes in the first network is equal to the number of nodes in the second network and each unique node in the first network is paired with a unique node of the second network as a node pair (e.g., as an unconnected node pair).

According to some embodiments, the connection degree of an unconnected node pair is equal to the smaller or lower of a connection degree of the first node and a connection degree of the second node of the unconnected node pair, by definition. For example, the first node may have a connection degree of five (5) and the second node may have a connection degree of two (2). Then, the connection degree of the unconnected node pair of the example is two (2), by the definition above. In other embodiments, the connection degree of the unconnected node pair is defined as a sum of the connection degrees of first and second nodes thereof. For the example above with node connection degrees of two (2) and five (5), the connection degree of the example unconnected node pair is seven (7). In yet other embodiments, the connection degree of the unconnected node pair may be equal to a connection degree of one of the nodes of the unconnected node pair. For example, the connection degree of the first network node (i.e., first node connection degree) in the unconnected node pair may be used as the unconnected node pair connection degree. In another example, the unconnected node pair connection degree may be equal to the connection degree of the second node of the unconnected node pair. In yet other embodiments, another definition of node pair connection degree may be employed.

According to some embodiments of the method 100 of increasing diffusion, selecting 110 an unconnected node pair having a lowest connection degree and connecting 120 the nodes of the selected unconnected node pair are repeated. In particular, selecting 110 an unconnected node pair and connecting 120 the first and second nodes of the selected unconnected node pair may be repeated for other unconnected node pairs in the first and second networks until a predetermined percentage of unconnected node pairs are connected 120. For example, selecting 110 an unconnected node pair and connecting 120 the nodes of the selected unconnected node pair may be repeated until about sixty percent (60%) or about seventy percent (70%) or about eighty percent (80%) or about ninety percent (90%) or more of the unconnected node pairs are connected 120. Selecting 110 an unconnected node pair and connecting 120 the nodes of the selected unconnected node pair may be repeated until about seventy-five percent (75%) or more of the unconnected node pairs are connected 120, for example. The predetermined percentage of connected 120 unconnected node pairs may be chosen based on a priori information relating connection percentage to diffusion rate, for example. In other embodiments, selecting 110 an unconnected node pair and connecting 120 the first and second nodes of the selected unconnected node pair are repeated until a predetermined rate of diffusion for the NoN is achieved.

Figure 2A:
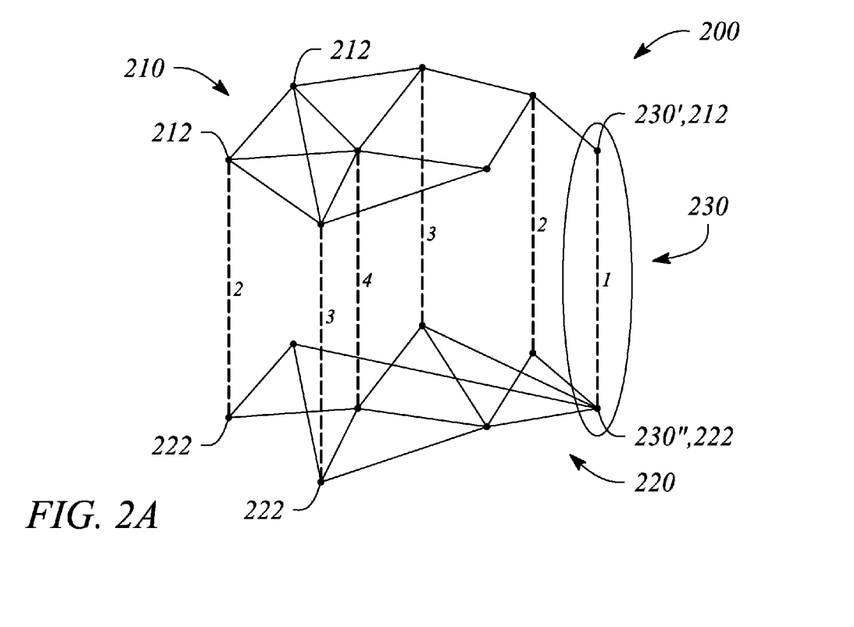
FIG. 2A illustrates a schematic diagram of a network of networks (NoN), according to an embodiment consistent with the principles of the present invention.

FIG. 2A illustrates a schematic diagram of a network of networks (NoN) 200, according to an embodiment consistent with the principles of the present invention. As illustrated, the NoN 200 comprises a first network 210 and a second network 220. The first network 210 has a plurality of interconnected nodes 212 and the second network 220 has a plurality of interconnected nodes 222, as illustrated. Further, the number of nodes 212, 222 in each of the first and second networks 210, 220 is equal by way of example and not limitation, as illustrated. FIG. 2A further illustrates a plurality of unconnected node pairs 230 represented by respective pairs of the nodes 212, 222 connected by dashed lines.

In FIG. 2A, a first node 230' of an unconnected node pair 230 is a node 212 of the first network 210, while a second node 230" of the unconnected node pair 230 is a node 222 of the second network 210. As illustrated, a number of the unconnected node pairs 230 is smaller than a number of the nodes 212, 222 in the first and second networks 210, 220. Further in FIG. 2A, a connection degree of each of the unconnected node pairs 230 of the plurality is indicated by a number next to the dashed line. The connection degree illustrated in FIG. 2A is based on a lower or smaller of the connection degrees of the nodes in the pair, for example. The unconnected node pair 230 having a lowest connection degree (i.e., '1') is encircled in FIG. 2A for reasons provided below. Further, the lowest connection degree is determined according to the smaller connection degree of the first and second nodes 230', 230" of the unconnected node pair 230.

Figure 2B:
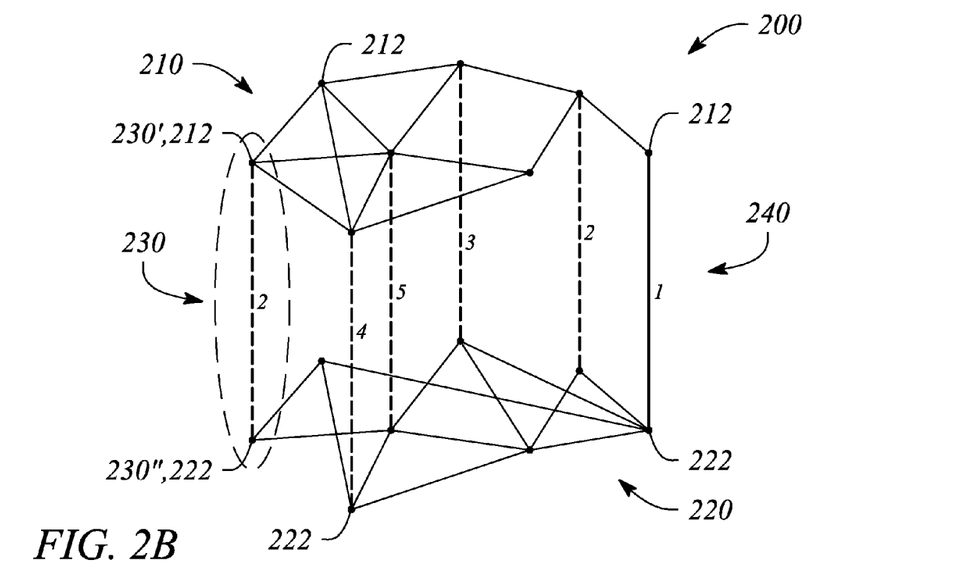
FIG. 2B illustrates a schematic diagram of the NoN of FIG. 2A, according to another embodiment of consistent with the principles of the present invention.

FIG. 2B illustrates a schematic diagram of the NoN 200 of FIG. 2A, according to another embodiment of consistent with the principles of the present invention. In particular, FIG. 2B illustrates the NoN 200 after selecting 110 an unconnected node pair 230 having the lowest connection degree (i.e., the encircled unconnected node pair 230 having the connection degree '1' in FIG. 2A) and connecting 120 together the first and second nodes 230', 230" of the selected unconnected node pair 230 to form a connected node pair 240. In FIG. 2B, a vertical solid line connecting between the first node 212 and second node 222 represents the nodes 212, 222 having been connected 120 to form the connected node pair 240, in accordance with the method 100 of increasing diffusion.

Note that there are two unconnected node pairs 230 with the same connection degree (of '2') illustrated in FIG. 2B, by way of example. When two or more unconnected node pairs 230 have the same connection degree, an arbitrary selection from among these unconnected node pairs 230 may be made when selecting 110 an unconnected node pair 230 having the lowest connection degree, in accordance with the method 100 of increasing diffusion. In other embodiments, the connection degree of a node 212, 222 in the respective unconnected node pairs 230 with equal connection degree (i.e., the node that was not used to determine the node pair connection degree) may be used as an arbiter in selecting 110. For example, when two or more unconnected node pairs 230 have the same connection degree, a selection 110 may be based on which unconnected node pair 230 has a lowest connection degree of a node 212, 222 that is not used in determining the connection degree of the unconnected node pair 230.

Figure 2C:
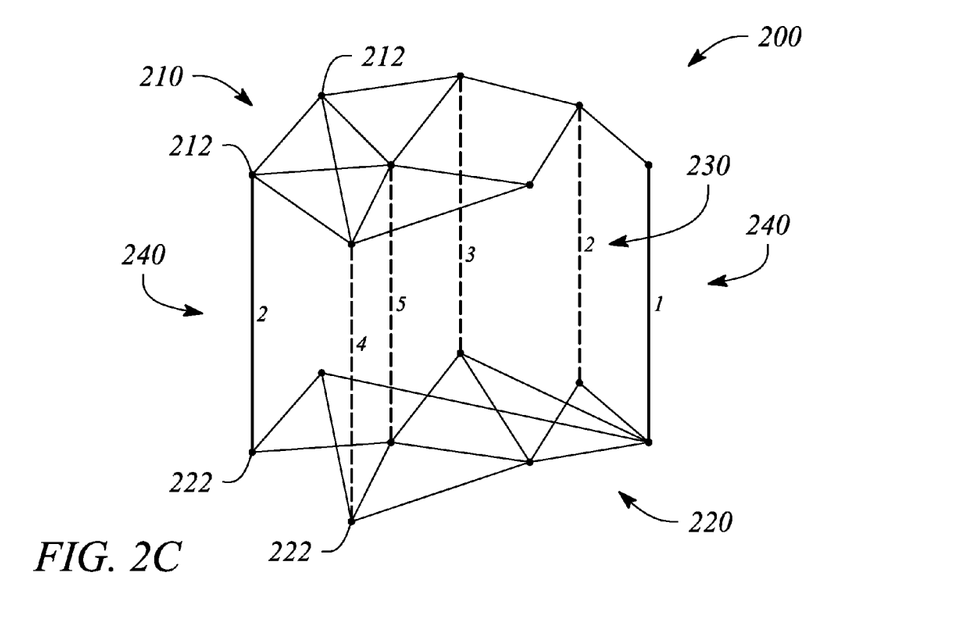
FIG. 2C illustrates a schematic diagram of the NoN of FIG. 2B, according to yet another embodiment of consistent with the principles of the present invention.

FIG. 2C illustrates a schematic diagram of the NoN 200 of FIG. 2B, according to yet another embodiment of consistent with the principles of the present invention. In particular, FIG. 2C illustrates the NoN 200 after selecting 110 an unconnected node pair 230 and connecting 120 the first and second nodes thereof are repeated for an unconnected node pair 230 having a next lowest connection degree. Referring back to FIG. 2B, of remaining sets of unconnected node pairs 230, an unconnected node pair 230 having the next lowest connection degree (i.e., '2') is encircled with a dashed line to represent the unconnected node pair 230 having been selected 110 (e.g., arbitrarily selected 110). In FIG. 2C, the first and second nodes 212, 222 of this selected 110 node pair are connected 120 together, illustrated using a vertical solid line, to form another connected node pair 240, and so on, in accordance with some embodiments of the method 100 of increasing diffusion.

Figure 3:
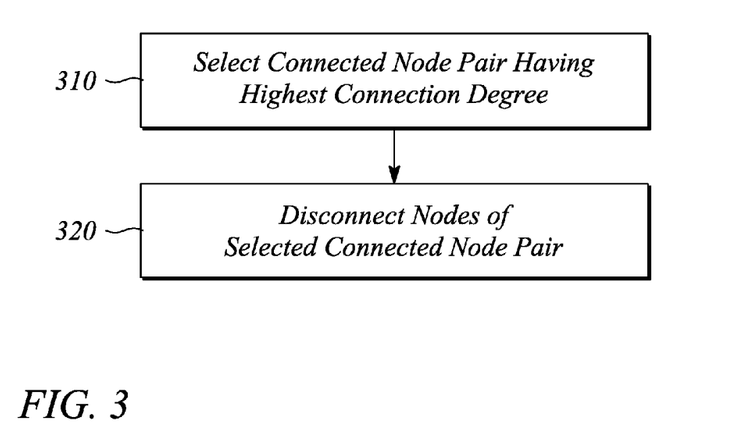
FIG. 3 illustrates a method of decreasing diffusion within a network of networks (NoN), according to an embodiment consistent with the principles of the present invention.

In some embodiments of the present invention, a method of decreasing diffusion is provided. FIG. 3 illustrates a method 300 of decreasing diffusion within a network of networks (NoN), according to an embodiment consistent with the principles of the present invention. As illustrated, the method 300 of decreasing diffusion comprises selecting 310 a connected node pair of the NoN having a highest connection degree relative to other connected node pairs of the NoN. Each connected node pair of the NoN, whether the connected node pair is selected or not, has a first node in the first network of the NoN and a second node in the second network of the NoN.

According to various embodiments, the method 300 of decreasing diffusion further comprises disconnecting 320 nodes of the selected connected node pair. In particular, the first node of the selected connected node pair is disconnected 320 from the second node of the selected connected node pair. Disconnecting 320 the nodes substantially transforms the selected connected node pair into an unconnected node pair. Moreover, disconnecting 320 the nodes may be substantially opposite to connecting 120 nodes of a selected unconnected node pair described above with respect to the method 100 of increasing diffusion, according to various embodiments. In particular, disconnecting 320 the nodes may be accomplished by any of a variety of means depending on an architecture or topology of the NoN (e.g., various structural and data communication characteristics of the NoN). For example, disconnecting 320 the nodes may employ one or more of a switch, a destination address, and disconnecting a cable that connects the nodes of the selected connected node pair. In particular, disconnecting 320 may employ a connection element, characteristic or structure (e.g., switch, cable, a destination address, etc.) of the NoN to disconnect the nodes, according to various embodiments.

According to some embodiments, the connection degree of a connected node pair is equal to the larger or higher of a connection degree of the first node and a connection degree of the second node of the connected node pair, by definition. For example, the first node may have a connection degree of five (5) and the second node may have a connection degree of seven (7). Then the connection degree of the connected node pair of the example is seven (7), by the definition above. In other embodiments, the connection degree of the connected node pair is defined as a sum of the connection degrees of the first and second nodes thereof. For the example above with node connection degrees of five (5) and seven (7), the connection degree of the example connected node pair is twelve (12). In yet other embodiments, the connection degree of the connected node pair may be a connection degree of one of the nodes of the connected node pair. For example, the connection degree of the first node of the first network (i.e., first node connection degree) in the connected node pair may be used as the connected node pair connection degree. In another example, the connected node pair connection degree may be equal to the connection degree of the second node. In yet other embodiments, another definition of node pair connection degree may be employed.

According to some embodiments of the method 300 of decreasing diffusion, selecting 310 a connected node pair having a highest connection degree and disconnecting 320 the nodes of the selected connected node pair are repeated. In particular, selecting 310 a connected node pair and disconnecting 320 the first and second nodes of the selected connected node pair may be repeated for other connected node pairs until a predetermined percentage of connected node pairs are disconnected 320. For example, selecting 310 a connected node pair and disconnecting 320 the nodes of the selected connected node pair may be repeated until between about one percent (1%) and about ten percent (10%) of the connected node pairs are disconnected 320. In other examples, selecting 310 a connected node pair and disconnecting 320 the nodes of the selected connected node pair may be repeated until about point five percent (0.5%), five percent (5%), fifteen percent (15%), twenty percent (20%) or more of the connected node pairs are disconnected 320. The predetermined percentage of disconnected connected node pairs may be chosen based on a priori information relating connection percentage to diffusion rate, for example. In other embodiments, selecting 310 a connected node pair and disconnecting 320 the nodes of the selected connected node pair are repeated until a rate of diffusion of the NoN is reduced or falls below a predefined diffusion rate.

Figure 4A:
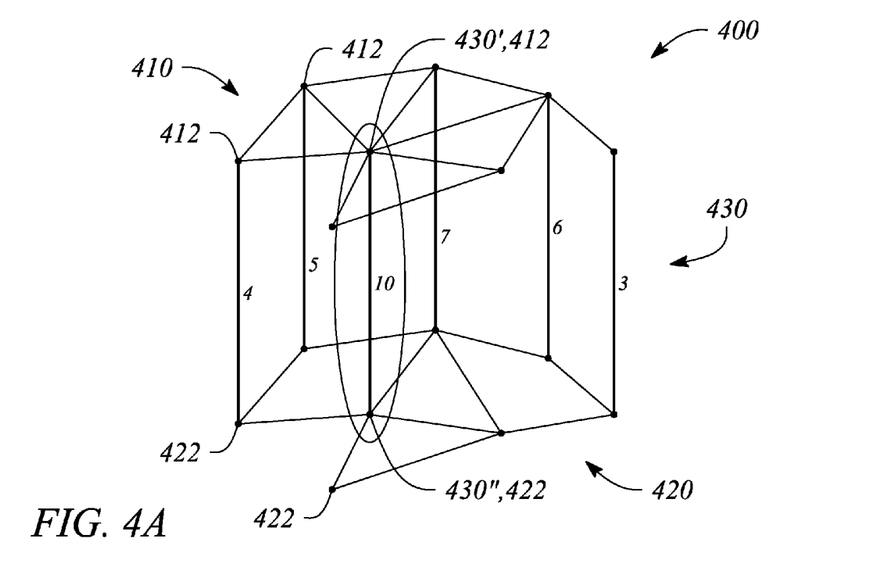
FIG. 4A illustrates a schematic diagram of a network of networks (NoN), according to an embodiment consistent with the principles of the present invention.

FIG. 4A illustrates a schematic diagram of a network of networks (NoN) 400, according to an embodiment consistent with the principles of the present invention. As illustrated, the NoN 400 comprises a first network 410 and a second network 420. The first network 410 has a plurality of interconnected nodes 412 and the second network 420 has a plurality of interconnected nodes 422, as illustrated. Further, the number of the nodes 412 in the first network 410 is equal to the number of the nodes 422 in the second network 420, by way of example and not limitation, as illustrated. FIG. 4A further illustrates a plurality of connected node pairs 430 represented by pairs of the nodes 412, 422 connected by respective vertical solid lines.

In FIG. 4A, a first node 430' of a connected node pair 430 is a node 412 of the first network 410, while a second node 430" of the connected node pair 430 is a node 422 of the second network 410. As illustrated in FIG. 4A, a number of the connected node pairs 430 is smaller than a number of the nodes 412, 422 in the first and second networks 410, 420. Further in FIG. 4A, a connection degree of each of the connected node pairs 430 of the plurality is indicated by a number next to the vertical solid line. The connection degree of the connected node pairs 430 is a sum of the connection degrees of respective ones of the first and second nodes 430', 430" of the connected node pair 430, as illustrated in FIG. 4A. Further, the connected node pair 430 having a highest connection degree (e.g., '10') is encircled in FIG. 4A, for reasons provided below.

Figure 4B:
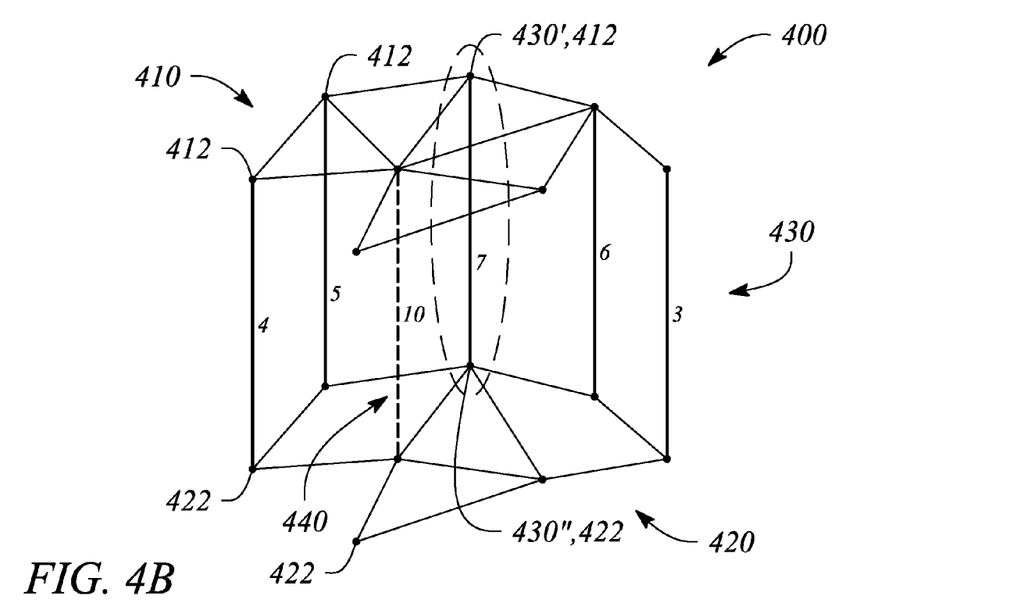
FIG. 4B illustrates a schematic diagram of the NoN of FIG. 4A, according to another embodiment of consistent with the principles of the present invention.

FIG. 4B illustrates a schematic diagram of the NoN 400 of FIG. 4A, according to another embodiment of consistent with the principles of the present invention. In particular, FIG. 4B illustrates the NoN 400 after selecting 310 a connected node pair 430 having the highest connection degree (i.e., the encircled node pair 430 illustrated in FIG. 4A having the connection degree '10') and disconnecting 320 the first and second nodes 430', 430" of the selected connected node pair 430 to form an unconnected node pair 440. In FIG. 4B, a vertical dashed line connecting between the first and second nodes 412, 422 represents the unconnected node pair 440, in accordance with the method 300 of decreasing diffusion. Note that when two or more connected node pairs 430 have the same connection degree, an arbitrary selection from among these connected node pair 430 may be made when selecting 310 a connected node pair, in some embodiments. In other embodiments, another means of selecting 310 among connected node pairs 430 having the same connection degree may be employed (e.g., selecting 310 a connected node pair 430 with a highest connection degree node 412, 422).

Figure 4C:
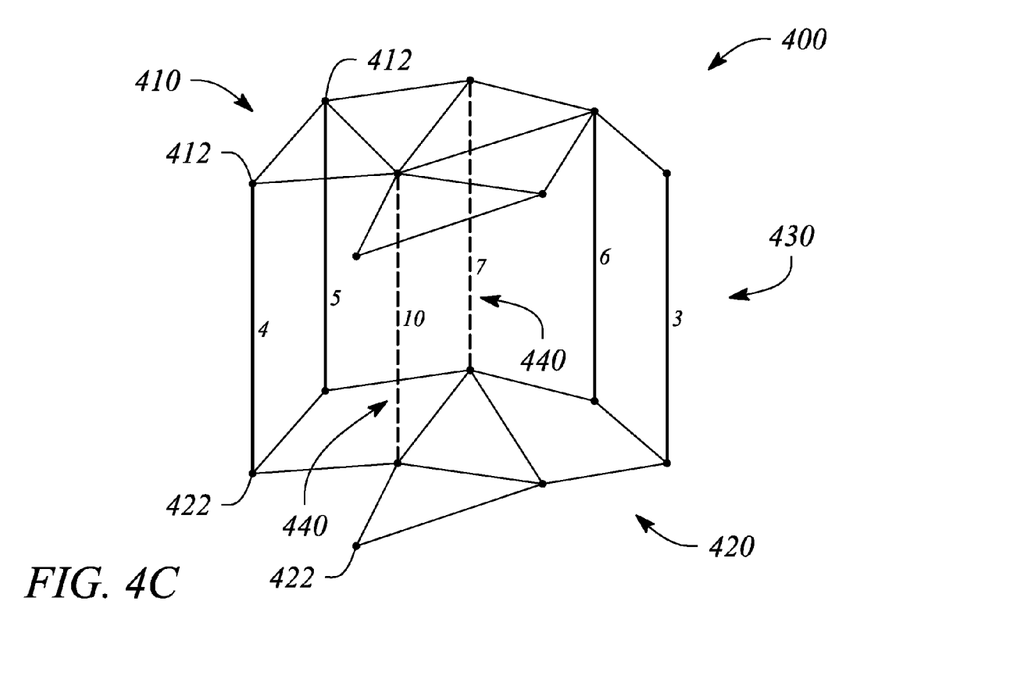
FIG. 4C illustrates a schematic diagram of the NoN of FIG. 4B, according to yet another embodiment of consistent with the principles of the present invention.

FIG. 4C illustrates a schematic diagram of the NoN 400 of FIG. 4B, according to yet another embodiment of consistent with the principles of the present invention. In particular, FIG. 4C illustrates the NoN 400 after selecting 310 a connected node pair with the highest connection degree and disconnecting 320 the nodes thereof are repeated for a connected node pair 430 having a next highest connection degree. Referring back to FIG. 4B, of remaining sets of connected node pairs 430, a connected node pair 430 having the next highest connection degree (i.e., '7') is encircled with a dashed line. In FIG. 4C, the first and second nodes 412, 422 of this selected 310 node pair are disconnected 320, as illustrated by a vertical dashed line between the respective nodes thereof, to form another unconnected node pair 440, and so on, in accordance with some embodiments of the method 300 of decreasing diffusion.

Figure 5A:
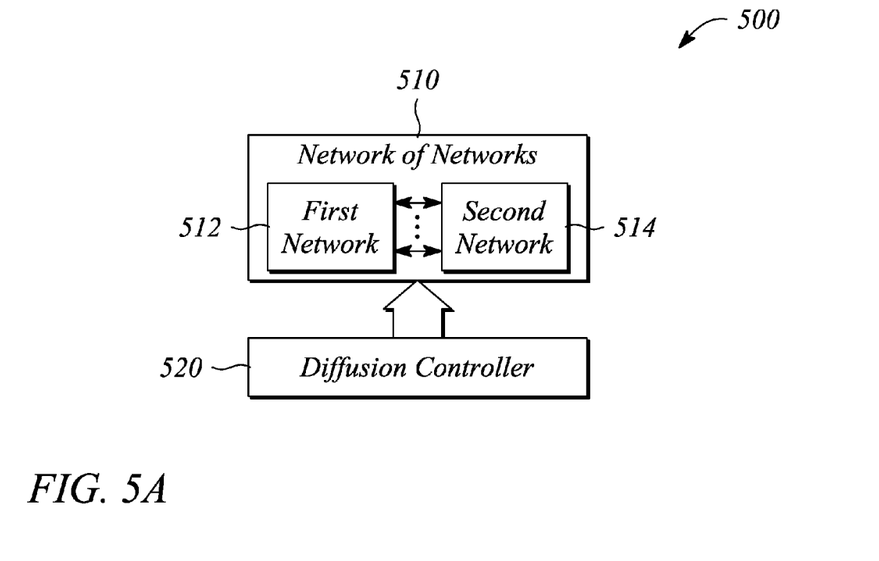
FIG. 5A illustrates a block diagram of a network diffusion control system, according to an embodiment consistent with the principles of the present invention.

In some embodiments of the present invention, a network diffusion control system is provided. FIG. 5A illustrates a block diagram of a network diffusion control system 500, according to an embodiment consistent with the principles of the present invention. As illustrated, the network diffusion control system 500 comprises a network of networks (NoN) 510. According to various embodiments, the NoN 510 may be substantially similar to any of the NoNs described above. In particular, the NoN 510 comprises a first network 512 and a second network 514, for example. The first and second networks 512, 514 may be related or associated to one another by having a plurality of corresponding node pairs illustrated as arrows in FIG. 5A. The corresponding node pairs may be one or both of unconnected node pairs and connected node pairs, according to various embodiments.

The network diffusion control system 500 illustrated in FIG. 5A further comprises a diffusion controller 520. The diffusion controller 520 is configured to one or both of increase a diffusion rate and decrease a diffusion rate within the NoN. In particular, the diffusion controller 520 may be configured to increase the diffusion rate within the NoN by connecting an unconnected node pair of the NoN having a lowest connection degree relative to other unconnected node pairs of the NoN. For example, the diffusion controller 520 may implement a method of increasing diffusion that is substantially similar to the method 100 of increasing diffusion described above. Further, the diffusion controller 520 may be configured to decrease the diffusion rate within the NoN by disconnecting a connected node pair of the NoN having a highest connection degree relative to other connected node pairs of the NoN. For example, the diffusion controller 520 may implement a method of decreasing diffusion that is substantially similar to the method 300 of decreasing diffusion described above. In yet other examples, the diffusion controller 520 may be configured to selectively increase and decrease the rate of diffusion by implementing both the method increasing diffusion and the method of decreasing diffusion described herein.

In particular, the unconnected node pairs and the connected node pairs of the NoN 510 each have a first node of the node pair in the first network 512 of the NoN 510 and a corresponding second node of the node pair in the second network 514 of the NoN 510, according to various embodiments. Further, a connection degree of the unconnected node pairs and a connection degree of the connected node pairs may be defined as described above. For example, the connection degree of the unconnected node pair may be equal to the smaller or lower of a connection degree of the first node and a connection degree of the corresponding second node of the unconnected node pair. Similarly, a connection degree of the connected node pair may be equal to the larger or higher of a connection degree of the first node and a connection degree of the corresponding second node of the connected node pair, for example. In other examples, the connection degree of one or both of an unconnected node pair and a connected node pair may be defined as the sum of the connection degrees of the first node and the corresponding second node of the unconnected node pair and connected node pair, respectively.

In some embodiments, the unconnected node pairs may be predetermined pairs of nodes in the NoN 510. In some embodiments, the first network 512 has a number of nodes equal to a number of nodes in the second network 514. In other examples, the number of nodes in each of the first network 512 and the second network 514 differs. Also, the NoN 510 may be a 'one-to-one' connected NoN or may have one or both fewer unconnected node pairs and fewer connected node pairs than there are nodes in either or both the first and second networks.

According to various embodiments, the diffusion controller 520 may be implemented in any of a variety of manners. For example, the diffusion controller 520 may be implemented as a hardware apparatus. The hardware apparatus implementation may include, but is not limited to, one or more of an IC, a VLSI, an ASIC, and an FPGA implementation, for example. In other examples, the diffusion controller 520 may be implemented as software or firmware, a combination thereof or one or both thereof in combination with one or more of the above-mentioned hardware implementations. The software or firmware may be stored in a memory and executed by a processor, for example.

Figure 5B:
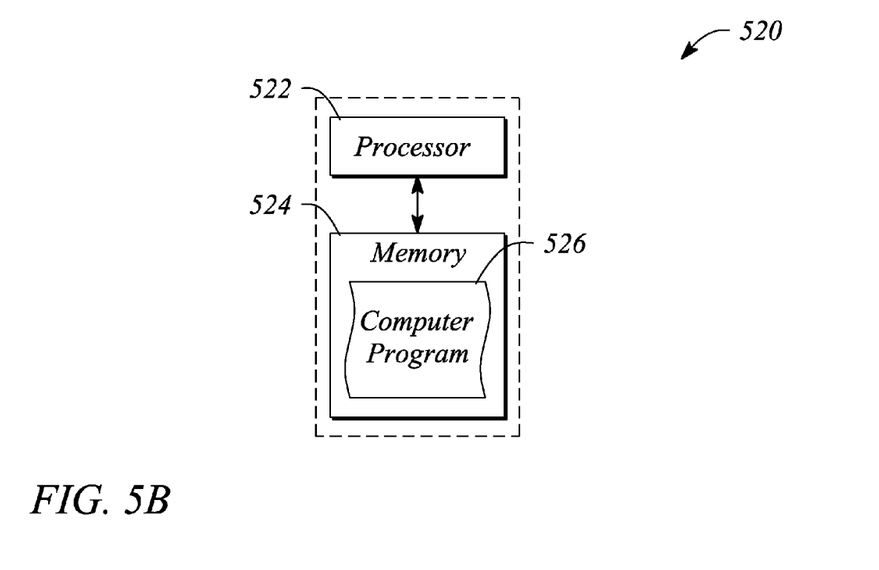
FIG. 5B illustrates a block diagram of a diffusion controller implementation, according to an embodiment consistent with the principles of the present invention.

FIG. 5B illustrates a block diagram of a diffusion controller implementation, according to an embodiment consistent with the principles of the present invention. As illustrated, the diffusion controller 520 comprises a processor 522, a memory 524 and a computer program 526. The computer program 526 is stored in the memory 524 and has instructions that, when executed by the processor 522, the instructions one or both of implement increasing the diffusion rate by connecting the unconnected node pairs and implement decreasing the diffusion rate by disconnecting the connected pairs. The processor 522 may be a processor of a general-purpose computer (e.g., a microprocessor) and the memory 524 may be non-transitory memory (e.g., random access memory, a computer readable medium, etc.) of the general-purpose computer, for example. In another example, a specialized processor such as, but not limited to, a neuromorphic processor and a graphics processor may be employed.

In some embodiments, the instructions that implement increasing the diffusion rate further implement selecting the unconnected node pair with the lowest connection degree. In some embodiments, the unconnected node pairs are predetermined node pairs of the NoN. In some embodiments, the instructions that implement decreasing the diffusion rate further implement selecting the connected node pair with the highest connection degree. In some embodiments, the instructions implement increasing or decreasing the diffusion rate until a predetermined diffusion rate is reached.

In some embodiments of the present invention, a non-transitory computer readable medium is provided. In particular, the provided non-transitory computer readable medium is encoded with instructions that, when executed by a processor, implement a diffusion control in a network of networks (NoN). According to various embodiments, the implemented diffusion control comprises one or both of selecting an unconnected node pair having a lowest connection degree relative to other unconnected node pairs of the NoN and connecting nodes of the selected unconnected node pair to one another to increase a diffusion rate of the NoN; and selecting a connected node pair having a highest connection degree relative to other connected node pairs of the NoN and disconnecting nodes of the selected connected node pair from one another to decrease the diffusion rate within the NoN.

The NoN operated on by the non-transitory computer readable medium may be substantially similar to any of the NoNs described above. In particular, the NoN may comprise a first network and a second network having predefined node pairs, a first node of the predefined node pairs being in the first network and a second node of the predefined node pairs being in the second network. The predefined node pairs may comprise the unconnected node pairs, for example, or the connected node pairs. Similarly, a node pair connection degree may be defined in a manner that is substantially similar to the node pair connections degrees described above. For example, a connection degree of a node pair may be equal to the smaller or lower of a connection degree of a first node and a connection degree of a second node of the node pair when increasing the rate of diffusion. A connection degree of a node pair may be equal to the larger or higher of a connection degree of a first node and a connection degree of a second node of the node pair when decreasing the rate of diffusion, for example.

In some embodiments, the non-transitory computer readable medium may be substantially similar to the memory 524 of the diffusion controller 520, described above and illustrated in FIGS. 5A-5B. Further, the instructions stored by or encoded in the non-transitory computer readable medium may be provided by a computer program that is substantially similar to the computer program 526 of the diffusion controller 520, described above. In particular, a network of networks diffusion control system may comprise the non-transitory computer readable medium. The network of networks diffusion control system may further comprise a processor to execute the instructions stored or encoded in the non-transitory computer readable medium. In some embodiments, the network of networks diffusion control system may further comprise the NoN. According to various embodiments, the NoN comprises a first network and a second network. The first network comprises first nodes and the second network comprises corresponding second nodes of respective unconnected node pairs and connected node pairs, according to various embodiments. In some embodiments, the network of networks diffusion control system that comprises the non-transitory computer readable medium is substantially similar to the network of networks diffusion control system 500 described above.

According to various embodiments of the present invention, one or both of the increased diffusion or diffusion rate and the decreased diffusion or diffusion rate may be relative to a change in diffusion in which node pairs are selected at random. For example, the method 100 of increasing diffusion comprising selecting 110 a 'lowest connection degree' unconnected node pair for connection 120 may provide an increase in diffusion relative to randomly selecting an unconnected node pair for connection. Similarly, the method 300 of decreasing diffusion comprising selecting 110 a 'highest connection degree' connected node pair for disconnection 320 may provide a decrease in diffusion relative to randomly selecting a connected node pair for disconnection.

Figure 6:
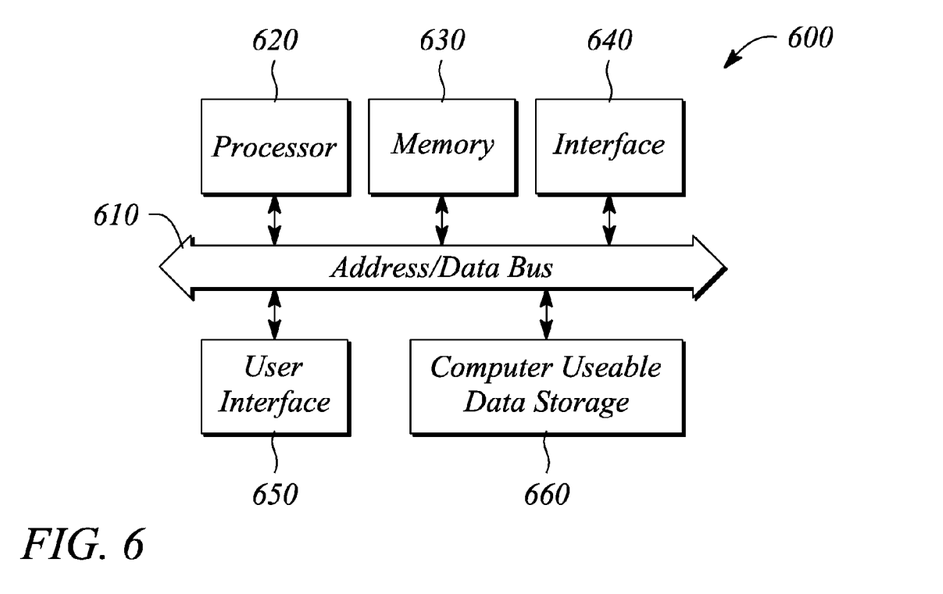
FIG. 6 illustrates a block diagram of a general-purpose computer, according to an embodiment consistent with the principles of the present invention.

FIG. 6 illustrates a block diagram of a general-purpose computer 600, according to an embodiment consistent with the principles of the present invention. The general-purpose computer 600 may be configured to implement (e.g., using a computer program) one or both of the method 100 of increasing diffusion within a network of networks (NoN) and the method 300 of decreasing diffusion within a NoN, according to various embodiments. The general-purpose computer 600 may be also be configured to implement the diffusion controller 520 described above with respect to the network diffusion control system 500, in some embodiments. In particular, the general-purpose computer of the diffusion controller 520 illustrated in FIG. 5B may be substantially similar to the general-purpose computer 600, for example.

As illustrated, the general-purpose computer 600 comprises an address/data bus 610. The address/data bus 610 is configured to communicate information between and among various constituent elements and modules of the general-purpose computer 600. The general-purpose computer 600 further comprises a processor 620. The processor 620 is coupled to the address/data bus 610 and is configured to process information and instructions (e.g., perform computations according to computer program instructions). In some embodiments, the processor 620 is a microprocessor. In other embodiments, the processor 620 may include, but is not limited to a parallel processor, a virtual processor (e.g., cloud-based), an ASIC, an FPGA, etc.

According to various embodiments, the general-purpose computer 600 further comprises memory 630. In particular, the memory 630 may be implemented as one or more data storage units coupled to the address/data bus 610. The memory 630 is configured to store information and instructions for use by the processor 620, for example. According to various embodiments, the memory 630 and more particularly the data storage units of the memory 630 may include, but are not limited to, random access memory (RAM), static RAM (SRAM), and dynamic RAM (DRAM) that is coupled to the address/data bus 610. In some embodiments, the memory 630 includes or further includes substantially non-volatile memory such as, but not limited to, read-only memory (ROM), erasable programmable ROM (EPROM), electrically erasable programmable ROM (EEPROM), and flash memory. The substantially non-volatile memory may be coupled to the address/data buss 610 to provide non-volatile storage of information and instructions to be used by the processor 620, for example.

According to some embodiments, the processor 620 may be configured to one or both of execute instructions (e.g., a computer program) and employ data stored in a remote or online data storage unit such as in so-called 'cloud' computing. In these embodiments, the memory 630 may comprise the online data storage unit. According to some embodiments, the memory 630 may comprise a non-transitory computer readable medium and may include or be encoded with instructions (e.g., computer program instructions) that, when executed by the processor 620, implement a diffusion control in a network of networks (NoN).

In some embodiments, the general-purpose computer 600 may further comprise an interface 640, illustrated in FIG. 6. The interface 640 may be coupled to the address/data bus 610, for example. According to various embodiments, the interface 640 is configured to interface or communicate with other electronic devices and computer systems. According to various embodiments, the interface 640 may include various communications technology such as wired or wireline interfaces (e.g., serial cables, modems, network adapters, etc.) and wireless interfaces (e.g., WiFi and other wireless modems, wireless network adapters, etc.).

In some embodiments, the general-purpose computer 640 may further comprise a user interface 650 coupled to the address/data bus 610. The user interface 650 may include, but is not limited to, an input device (e.g., keyboard, mouse, track-pad, touch screen, etc.) configured to communicate information and commands from a user to the processor 620 and a display device configured to communicate information from the processor 620 to a user. According to various examples, the display device may include, but is not limited to, a cathode ray tube (CRT), a liquid crystal display (LCD), a field emission display (FED), a plasma display, and substantially any other display device suitable for displaying information (e.g., video, alphanumeric data, etc.) to a user.

In some embodiments, the general-purpose computer 600 may further comprise computer useable data storage 660. According to some embodiments, the computer useable data storage 660 is coupled to the address/data bus 610 and is configured to store information including, but not limited to, computer executable instructions (e.g., a computer program). For example, the computer useable data storage 660 may comprise a non-transitory computer readable medium and may store or be encoded with instructions (e.g., stored computer program instructions) that, when executed by the processor 620, implement a diffusion control in an NoN. According to various embodiments, the computer useable data storage 660 may include, but is not limited to, a magnetic or optical disk drive, e.g., a hard disk drive (HDD), a floppy disk drive (FDD), a compact disc read-only memory (CD-ROM), a digital versatile disk (DVD), a thumb drive, etc. In some embodiments the computer useable data storage 660 may include or further include, network attached storage, cloud storage, etc.

The general-purpose computer 600 described herein is an example of a computing environment that may be employed (e.g., as the diffusion controller 520) to implement embodiments of the present invention. However, implementation is not restricted to using a general-purpose computer 600, as illustrated in FIG. 6. For example, other computing systems and computing environments including, but not limited to, a virtual computing environment and various specialized processing systems may be employed. In particular, according to some embodiments, one or more operations of various embodiments of the present invention may be controlled or implemented using computer-executable instructions, such as computer program modules, which are executed by a computer including, but not limited to the general-purpose computer 600. According to some embodiments, such computer program modules may include routines, programs, object components and data structures configured to perform particular tasks or implement particular abstract data types, for example. In addition, some embodiments provide that one or more aspects of the present invention may be implemented by utilizing a distributed computing environment, such as where tasks are performed by remote processing devices that are linked through a communications network, or such as where various program modules are located in both local and remote computer-storage media including memory-storage devices, for example.

Thus, there have been described examples of a method of increasing diffusion in a network of networks (NoN), a method of decreasing diffusion in an NoN, a network diffusion control system and a non-transitory computer readable medium that employ connection degrees of unconnected and connected node pairs to control diffusion in the NoN. It should be understood that the above-described examples are merely illustrative of some of the many specific examples and embodiments that represent the principles consistent with the principles described herein. Clearly, those skilled in the art can readily devise numerous other arrangements without departing from the scope consistent with the principles described herein as defined by the following claims.

What is claimed is:

1. A method of increasing diffusion within a network of networks (NoN), the method comprising:
   selecting an unconnected node pair of the NoN based on a lowest connection degree relative to other unconnected node pairs of the NoN, the unconnected node pairs of the NoN each having a first node in a first network of the NoN and a second node in a second network of the NoN; and
   connecting the first node of the selected unconnected node pair to the second node of the selected unconnected node pair using a connecting element of the NoN.

2. The method of increasing diffusion of claim 1, wherein selecting an unconnected node pair having a lowest connection degree and connecting the first node to the second node of the selected unconnected node pair are repeated for the other unconnected node pairs of the NoN until a predetermined percentage of unconnected node pairs are connected.

3. The method of increasing diffusion of claim 1, wherein a connection degree of the unconnected node pair is equal to the smaller of a connection degree of the first node and a connection degree of the second node of the unconnected node pair.

4. The method of increasing diffusion of claim 1, wherein the unconnected node pairs are predetermined pairs of nodes in the NoN.

5. The method of increasing diffusion of claim 4, wherein there are more nodes in one or both of the first network and the second network than predetermined pairs of nodes in the NoN.

6. A method of decreasing diffusion within a network of networks (NoN), the method comprising:
   selecting a connected node pair of the NoN based on a highest connection degree relative to other connected node pairs of the NoN, the connected node pairs each having a first node in a first network of the NoN and a second node in a second network of the NoN; and
   disconnecting the first node of the selected connected node pair from the second node of the selected connected node pair using a connecting element of the NoN.

7. The method of decreasing diffusion of claim 6, wherein selecting a connected node pair having a highest connection degree and disconnecting the first node from the second node of the selected connected node pair are repeated for the other connected node pairs until a rate of diffusion is reduced below a predefined diffusion rate.

8. The method of decreasing diffusion of claim 6, wherein a connection degree of the connected node pair is the sum of a connection degree of the first node and a connection degree of the second node of the connected node pair.

9. The method of decreasing diffusion of claim 6, wherein a number of nodes in the first network equals a number of nodes in the second network, the NoN being a one-to-one connected NoN.

10. A network diffusion control system comprising:
    a network of networks (NoN) that comprises a first network and a second network;
    a diffusion controller to one or both increase a diffusion rate within the NoN by connecting an unconnected node pair of the NoN based on a lowest connection degree relative to other unconnected node pairs of the NoN and decrease the diffusion rate within the NoN by disconnecting a connected node pair of the NoN based on a highest connection degree relative to other connected node pairs of the NoN,
    wherein respective node pairs of the unconnected node pairs and the connected node pairs each have a first node of the respective node pairs in the first network and a second node of the respective node pairs in the second network.

11. The network diffusion control system of claim 10, wherein a connection degree of the unconnected node pair is equal to the smaller of a connection degree of the first node and a connection degree of the second node of the unconnected node pair, and a connection degree of the connected node pair is equal to the larger of a connection degree of the first node and a connection degree of the second node of the connected node pair.

12. The network diffusion control system of claim 10, wherein the unconnected node pairs are predetermined pairs of nodes in the NoN.

13. The network diffusion control system of claim 10, wherein the first network has a number of nodes equal to a number of nodes in the second network.

14. The network diffusion control system of claim 10, wherein the diffusion controller comprises:
    a processor;
    a memory; and
    a computer program stored in the memory and having instructions that, when executed by the processor, one or both of implement increasing the diffusion rate by connecting the unconnected node pair and implement decreasing the diffusion rate by disconnecting the connected node pair.

15. The network diffusion control system of claim 14, wherein the instructions that implement increasing the diffusion rate further implement selecting the unconnected node pair with the lowest connection degree, the unconnected node pairs being predetermined node pairs of the NoN.

16. The network diffusion control system of claim 14, wherein the instructions that implement decreasing the diffusion rate further implement selecting the connected node pair with the highest connection degree.

17. A non-transitory computer readable medium including instructions that, when executed by a processor, implement a diffusion control in a network of networks (NoN), the implemented diffusion control comprising one or both of:
    selecting an unconnected node pair based on a lowest connection degree relative to other unconnected node pairs of the NoN and connecting nodes of the selected unconnected node pair to one another to increase a diffusion rate of the NoN; and
    selecting a connected node pair based on a highest connection degree relative to other connected node pairs of the NoN and disconnecting nodes of the selected connected node pair from one another to decrease the diffusion rate within the NoN.

18. The non-transitory computer readable medium of claim 17, wherein the NoN comprises a first network and a second network having predefined node pairs, a first node of the predefined node pairs being in the first network and a second node of the predefined node pairs being in the second network, and wherein the predefined node pairs comprise the unconnected node pairs.

19. The non-transitory computer readable medium of claim 17, wherein a connection degree of an unconnected node pair is equal to the smaller of a connection degree of a first node and a connection degree of a second node of the node pair to increase the rate of diffusion, and wherein a connection degree of a connected node pair is equal to the larger of a connection degree of a first node and a connection degree of a second node of the node pair to decrease the rate of diffusion.

20. A network of networks diffusion control system comprising the non-transitory computer readable medium of claim 17, the network of networks diffusion control system further comprising:
- a processor to execute the instructions encoded on the non-transitory computer readable medium; and
- the NoN, wherein the NoN comprises a first network and a second network, a respective first node of each of the unconnected node pairs and each of the connected node pairs being in the first network and a respective second node of each of the unconnected node pairs and each of the connected node pairs being in the second network.

\* \* \* \* \*